United States Patent
Song et al.

(10) Patent No.: US 6,323,306 B1
(45) Date of Patent: Nov. 27, 2001

(54) PREPARATION OF WATER-SOLUBLE CROSS-LINKED CATIONIC POLYMERS

(75) Inventors: Zhiqiang Song, Memphis, TN (US); George W. Schriver, Somerville, NJ (US); Dennis M. Mahoney, Long Valley, NJ (US); Louis E. Trapasso, Long Branch, NJ (US)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 0 days.

(21) Appl. No.: 09/149,628

(22) Filed: Sep. 8, 1998

(51) Int. Cl.$^7$ ............................... C08G 69/48; C08F 8/00; C08F 26/04; C08F 226/04; C08F 14/00
(52) U.S. Cl. ........................ 528/342; 528/224; 525/217; 525/359.5; 525/420; 525/426; 525/435; 525/540; 524/548; 524/612; 524/800; 524/802
(58) Field of Search ..................... 528/342, 224; 525/435, 217, 420, 359.5, 426, 540; 523/404; 524/612, 800, 548, 802

(56) References Cited

U.S. PATENT DOCUMENTS

| | | | |
|---|---|---|---|
| 3,544,318 | 12/1970 | Boothe et al. | 96/1.5 |
| 3,700,623 | 10/1972 | Keim | 260/80.3 |
| 3,833,531 | 9/1974 | Keim | 260/29.6 |
| 3,840,504 | 10/1974 | Keim | 260/79.3 |
| 3,968,037 | 7/1976 | Morgan et al. | 210/47 |
| 3,968,317 | 7/1976 | Dumas | 428/537 |
| 4,222,921 | 9/1980 | Van Eenam | 260/29.6 |
| 4,341,887 | 7/1982 | Buriks et al. | 526/263 |
| 4,354,006 | 10/1982 | Bankert | 525/359.5 |
| 4,419,498 | 12/1983 | Bankert | 525/426 |
| 4,419,500 | 12/1983 | Bankert | 525/540 |
| 4,439,580 | 3/1984 | Schaper | 524/801 |
| 4,529,754 | 7/1985 | Walther | 523/404 |
| 4,537,831 | 8/1985 | Di Stefano | 428/514 |
| 4,742,134 | 5/1988 | Butler et al. | 526/238 |
| 5,147,411 | 9/1992 | Töpfl | 8/606 |
| 5,236,993 | 8/1993 | Login et al. | 524/548 |
| 5,414,068 | 5/1995 | Bleim et al. | 528/288 |

FOREIGN PATENT DOCUMENTS

| | | |
|---|---|---|
| 0 223 222 | 5/1987 | (EP) . |
| 0264710 | 5/1993 | (EP) . |
| 6108382 | 4/1994 | (JP) . |

OTHER PUBLICATIONS

Abstr. for EP 0264710.
Abstr. for JP 6108382.
Jaeger et al., Macromol. Sci. Chem., A21(5), 593 (1984).

*Primary Examiner*—P. Hampton-Hightower
(74) *Attorney, Agent, or Firm*—David R. Crichton

(57) ABSTRACT

High molecular weight, water-soluble, cross-linked cationic polymers are prepared by reacting amine-functionalized cationic base polymers, in which the monomer units of the base polymer contain from about 0.05 to about 5.0% amine functionalized monomer units and from about 95 to about 99.95% additional monomer units, including cationic monomer units and optional non-cationic monomer units, with an amount of a cross-linking agent, reactive with the amines of the base polymer, providing between about 0.02 to about 3.0 equivalents of cross-linking agent reactive groups per each mole of amine. The polymers are useful as coagulants and as coatings.

16 Claims, No Drawings

PREPARATION OF WATER-SOLUBLE CROSS-LINKED CATIONIC POLYMERS

BACKGROUND OF THE INVENTION

The present invention relates to the preparation of water-soluble cross-linked cationic polymers, and methods for preparing such polymers with high molecular weights. The present invention also relates to methods for using such polymers to coat substrates and to separate suspended particle from an aqueous medium.

Cationic polymers have been used extensively in water treatment, paper making, mineral processing, petroleum recovery, textile dyeing, cosmetics and pharmaceuticals. Among the most important and extensively used cationic polymers are the quaternary ammonium polymers of diallyldimethylammonium chloride (DADMAC). In many cases, it is known that high molecular weight cationic polymers are more effective in such end uses.

Polymerization of DADMAC is typically carried out in aqueous solution using a free radical initiator such as a persulfate salt. Several approaches have been tried to increase the molecular weight of DADMAC polymers, including polymerization with added inorganic salts, polymerization in oil-in-water emulsions or suspended droplets, and addition of cross-linkers during polymerization. These methods are well known to those skilled in the art.

U.S. Pat. No. 4,222,921 discloses that the use of a diallylamine salt other than hydrohalide markedly speeds up the polymerization rate using ammonium persulfate (APS) as initiator. The conversion of monomer to polymer was substantially greater when the diallylamine salt polymerized was a salt of a strong acid (e.g., sulfuric acid) other than hydrohalide acids (e.g., hydrochloric acid). It was speculated that the halide ion acted as a chain transfer agent and a chain terminator.

Jaeger et al., *Macromol. Sci. Chem.*, A21(5) 593 (1984) reported that persulfate could oxidize chloride ion to produce chlorine radical which then would terminate polymerization and decrease molecular weight. They obtained relatively high MW polyDADMAC using an azo initiator instead of persulfate.

U.S. Pat. No. 4,742,134 discloses that increased polymerization rate and molecular weight can be obtained using fluoride salts with persulfate initiator. Halide salts other than fluoride (e.g. NaCl) did not accelerate polymerization or increase molecular weight.

U.S. Pat. No. 4,439,580 nevertheless demonstrated that use of ammonium persulfite initiator with added NaCl salt in inverse emulsion polymerization also gave high MW polylDADMAC. The narrow pH range (8.0 to 10.5) and added salts used in the inverse (water-in-oil) emulsion polymerization were claimed to be critical elements for successful polymerization.

Use of cross-linking or branching agents in polymerization is another way to produce high MW cationic polymers. Polymerization with cross-linking agents can give high MW as well as structured polymers. A highly branched polyDADMAC can have better efficacy than a linear one of similar MW in certain types of applications. U.S. Pat. No. 3,544,318 discloses that branched polyDADMAC works better than linear polyDADMAC for electroconductive paper because the branched polymer imparts superior properties to the electroconductive paper substrate, preventing solvent diffusion into the paper.

U.S. Pat. No. 3,968,037 also showed that cationic polymers made by inverse emulsion polymerization with cross-linking and branching agents had surprisingly high effectiveness as flocculants and for the treatment of activated sewage sludge. Polyolefinic unsaturated compounds, such as tri- and tetra-allylammonium salts or methylene bisacrylamide, were used as cross-linking agents. Only ineffective products were obtained by solution polymerization with a cross-linking agent.

EP 264,710 also disclosed that highly branched, water soluble polyDADMAC made by solution polymerization worked better as a flocculent or as a defoaming agent for breaking oil-in-water emulsions. Highly branched poly-DADMAC was made by adding 0.1 to 3.0 mole % of cross-linking co-monomer such as methyltriallylammonium chloride (MTAAC) or triallylamine hydrochloride (TAAHCl) during the polymerization of DADMAC, beginning after monomer conversion had reached 25% to 90%. A completely gelled product was obtained when the MTAAC was added all at once in the beginning.

The amount of epihalohydrin added is only partially reacted in the final resins to maintain water solubility. If allowed to react fully, the poly(diallylamine)-epihalohydrin resins will gel and become water insoluble. Only epihalohydrin is disclosed as a cross-linker for diallylamine polymers. Other polyfunctional compounds which can be used to cross-link the diallylamine polymers are not mentioned.

U.S. Pat. Nos. 3,700,623 and 3,833,531 teach the making of acid-stabilized poly(diallylamine)-epihalohydrin resins. Polymers of diallylamine were first prepared through radical polymerization using a radical initiator. The polymer of diallylamine was then reacted with an epihalohydrin, usually epichlorohydrin, at a temperature of from about 30 to 80° C. and a pH of from 7 to 9.5 in aqueous solution. When the viscosity measured on a 20% to 30% solid solution reached a desired viscosity range (A to E on the Gardner-Holdt scale), the product was diluted with water to below 15% solids. The obtained resin has a tendency to gel on standing. The resin solution is thus stabilized against gelation by addition of sufficient water-soluble acid (e.g. Hcl) to maintain the pH at about 2. The acid-stabilized poly (diallylamine)-epichlorohydrin resins are reactivated prior to use by addition of a base (e.g. NaOH) to adjust pH to above 7.

The polymers of diallylamine which can be reacted with an epihalohydrin for making the poly(diallylamine) epihalohydrin resins include homopolymers and copolymers of a reactive diallylamine monomer. The reactive diallylamine monomers include secondary diallylamines and tertiary monoalkyldiallylamines such as methyldiallylamine. The poly(diallylamine)- epihalohydrin resins are polymers having more than 5 mole % of recurring units derived from the reactive diallyamine monomer.

The diallylamine units in the polymers are capped with epihalohydrin. The added epihalohydrin is mostly half reacted to minimize cross-linking and maintain water solubility. Because of the high content of diallylamine and epihalohydrin used, water-insoluble gel products are obtained if the added epihalohydrin is allowed to react fully. Therefore, the resins need to be stabilized by addition of acid. Although soluble, these capped prepolymers are not yet cross-linked.

The half-reacted epihalohydrin entities of the alkaline curing resins impart epoxy functionality for cross-linking reactions after being reactivated by addition of alkaline base prior to use. These polymers are insoluble after cross-linking.

U.S. Pat. Nos. 4,354,006; 4,419,498; and 4,419,500 teach a process for making poly(DAA-Epi)polymers by reacting a DAA polymer first with an allyl halide and then with hypohalous acid to convert the allyl substituents to halohydrin moieties.

JP 6,108,382 discloses another way to make poly(diallylamine)-epihalohydrin polymers. A diallylamine-epihalohydrin (DAA-Epi) halo salt monomer is first prepared by reacting diallylamine with an epihalohydrin (typically epichlorohydrin) and then neutralizing with a halo acid (typically HCl). The DAA-Epi tertiary amine salt monomer is then polymerized using a radical initiator. The obtained poly(diallyamine)-epihalohydrin polymer is disclosed to provide excellent wet color fastness to a cellulose-based fiber dyed with a direct dye or a reactive dye.

U.S. Pat. No. 5,147,411 discloses a method to prepare the DAA-Epi monomers (3-halo-2-hydroxypropyl)diallylamine and (2,3-epoxypropyl)diallylamine, and their quaternary ammonium salts. The quaternary ammonium DAA-Epi salts are prepared by reacting a DAA-Epi tertiary amine with an alkylsulfonate. The DAA-Epi quaternary ammonium salts are used directly in treating cellulose fiber material for improved color yield and wet fastness of dyeing.

U.S. Pat. No. 4,341,887 discloses that the reaction product of diallylamine and epichlorohydrin (3-chloro-2-hydroxypropyl)diallylamine (a DAA-Epi monomer), can be converted to N,N-diallyl-3-hydroxy-azetidinium chloride (DAA-Epi azetidinium monomer) by heating in presence of water. Removal of the solvent (water) by distillation or freeze drying causes the DAA-Epi azetidinium monomer to reconvert to the linear, non-quaternary N-3-chloro-2-hydroxypropyl-N,N-diallylamine. (3-chloro-2-hydroxypropyl)diallylamine is not stable for long periods of time and dimerizes to 2,5-bis(diallylaminomethyl)-p-dioxane. The azetidinium ring remains intact in the polymers obtained by free radical polymerization of the DAA-Epi azetidinium monomer. $_1$H NMR and $^{13}$C NMR was used to identify the azetidinium ring in the monomer and the polymers. The homo- and co-polymers of N,N-diallyl-3-hydroxyazetidinium are useful for demulsification, flocculation and floatation in water treatment.

U.S. Pat. No. 4,537,831 discloses use of diallylamine polymers as agents for cross-linking chlorine-containing polymers such as copolymers of vinyl chloride and ethylene.

The alkaline-curable polymer systems have high diallylamine and epihalohydrin content (>5 mole %) for required high cross-link density in their end uses as resins.

In order to prepare cationic polymers of high molecular weight by solution polymerization, it is usually necessary to use solutions with high concentrations of the cationic monomer. During the course of the polymerization, the viscosity of the reaction medium increases to very high levels. Poor mixing and heat transfer in these highly viscous solutions limits the obtainable molecular weight of the cationic polymers. Accordingly, there remains a need for high molecular weight water-soluble cationic polymers.

SUMMARY OF THE INVENTION

It has now been discovered that modification of a water-soluble cationic polymer with small amounts of a reactive amino monomer by radical copolymerization and then chain-extending or cross-linking the amine-modified base polymer with small amount of an appropriate chain extending or cross-linking agent by a controlled step addition reaction increases molecular weight without a loss of water solubility.

The present invention also incorporates the discovery that a completely water-soluble polymer can be obtained by fully reacting a diallylamine-modified water-soluble polymer with a small amount of epihalohydrin. It has also been discovered that compounds other than epihalohydrin can be used to cross-link DAA copolymer.

The present invention thus provides a process for the preparation of cationic-based polymers of low or intermediate viscosity that can be diluted to a lower concentration and subsequently cross-linked to a higher molecular weight. Under conditions of lower concentration, the solution viscosity is not limiting.

Therefore, according to one aspect of the invention, a method is provided for the preparation of high molecular weight aqueous cationic polymer solutions, in which about a 5 to about a 25 wt. % solids aqueous solution is provided of an amine functionalized cationic base polymer, in which the monomer units of the polymer contain from about 0.05 to about 5.0% amine functionalized monomer units, each independently selected from primary, secondary and tertiary amine functionalized monomer units, and from about 95 to about 99.95% additional monomer units containing cationic monomer units and optional non-cationic monomer units, wherein the additional monomer units have a ratio of non-cationic to cationic monomer units between about 0:1 and about 10:1; to which there is added a cross-linking agent reactive with the primary, secondary, or tertiary amines of the base polymer, in an amount between about 0.02 to about 3.0 equivalents of the cross-linking agent reactive groups per each mole of primary, secondary or tertiary base polymer amines, so that the cross-linking agent reacts with the base polymer to form an aqueous solution of a higher molecular weight cross-linked cationic polymer.

Preferred methods in accordance with the present invention provide the aqueous solution of an amine functionalized cationic-based polymer by diluting a more concentrated solution of the base polymer. The diluted concentration of the aqueous solution of the base polymer is preferably selected to provide an aqueous solution of a higher molecular weight cross-linked cationic polymer having a commercially useful solids content. In general, it is desirable to produce as high a solids content as possible without the bulk viscosity becoming so great as to impede pumping or dissolution.

The prepolymers prepared by the method described above are stable species at all concentrations and can be stored for extended periods of time if need be before they are cross-linked to form the cross-linked soluble polymers of the instant invention.

Therefore, according to another aspect of the present invention, a high molecular weight, water-soluble, cross-linked cationic polymer is provided, prepared by reacting an amine functionalized cationic base polymer, in which the monomer units of the polymer contain from about 0.05 to about 5.0% amine functionalized monomer units, each independently selected from primary, secondary, and tertiary amine functionalized monomer units, and from about 95 to about 99.95% additional monomer units containing cationic monomer units and optional non-cationic monomer units, wherein the additional monomer units have a ratio of non-cationic to cationic monomer units between about 0:1 and about 10:1, an amount of a cross-linking agent reactive with the primary, secondary and tertiary amines of the base polymer, and providing between about 0.02 to about 3.0 equivalents of cross-linking agent reactive groups per mole of each primary, secondary, or tertiary base polymer amine. The cross-linked polymers of the present invention are prepared in a solution polymerization reaction in which an aqueous solution of the cationic base polymer is reacted with the cross-linking agent to provide an aqueous solution of the cross-linked cationic polymer, preferably having a solids content between about 5 and about 20 wt. %.

The soluble polymers of the instant invention are prepared from prepolymers containing sites suitable for cross-linking by added cross-linking reagents. A number of similar prepolymers have been disclosed previously, although heretofore the number of prepolymer cross-linking sites have been so numerous that the resulting polymers are cross-linked to an extent sufficiently high as to render them insoluble. These insoluble resins are quite different in their intended application from the soluble polymers whose preparation is taught herein.

The polymers of the present invention are particularly suitable for the removal of suspended particles in an aqueous medium. Therefore, according to another aspect of the present invention, a method is provided for the separation of suspended particles from an aqueous medium, which method includes the steps of:

(a) adding the aqueous polymer solution of the present invention to the aqueous medium in an amount effective to provide a polymer concentration of at least about 0.01 wt. %, so that agglomerates of the polymer and the suspended particles are formed; and (b) separating the agglomerates from the aqueous medium.

Lower molecular weight species of the polymers of the present invention agglomerate the suspended particles by coagulation, while higher molecular weight species agglomerate the suspended particles by flocculation. Polymer species that are of intermediate molecular weight are believed to agglomerate the suspended particles by a hybrid coagulation-flocculation mechanism.

These polymers can be used in conjunction with other flocculants and coagulants. The methods for arriving at optimum formulations of coagulants and flocculants are well known to those skilled in the art.

The particle agglomeration method of the present invention can be used in a number of industrial processes, which include, but are not limited to, potable and waste water clarification; oily water separation; sludge dewatering; mineral processing, including coagulation of fines and clarification of process water; and the like.

In addition to the foregoing separation methods, in which undesirable particles are removed for disposal, the method of the present invention can also be employed to recover desirable particles the would otherwise be lost with discarded process water. For example, in paper making the method of the present invention may employ the cross-linked polymers as a retention aid. Fine particles of pulp that would otherwise pass through the papermaking felt agglomerate to larger particles that settle onto the paper web.

In addition to particle coagulation and flocculation, the cross-linked polymers of the present invention may also be applied to other well-known end uses for cationic polymers. Such end uses include, but are not limited to, textile dye binders and dye thickeners; personal care applications, including shampoos, hair and skin conditioners, soaps and lotions; conductive coatings for paper, and the like.

Therefore, according to another aspect of the present invention, substrates are provided coated with a layer of the polymer of the present invention. The present invention also includes a method for preparing a coated substrate by forming on the substrate a layer of the aqueous cross-linked polymer solution of the present invention; and optionally drying the layer. Paper is a particularly preferred substrate.

Other features of the present invention will be pointed out in the following description and claims, which disclose the principles of the invention and the best modes which are presently contemplated for carrying them out.

DETAILED DESCRIPTION OF THE INVENTION

One aspect of the present invention is directed to a solution polymerization method for making high molecular weight water-soluble cationic polymers by cross-linking quaternary ammonium cationic base polymers with cross-linking agents which can react with the amino functional groups in the base polymer.

The method comprises:

(a) preparing an amine-functionalized cationic base polymer by free radical copolymerization, and then (b) reacting the base polymer with an appropriate cross-linking agent.

(a) Preparation of Amine-functionalized Base Polymer

The quaternary ammonium cationic base polymer is prepared by copolymerization of a quaternary ammonium cationic monomer (A), a copolymerizable monomer containing reactive amine group (B), and, optionally, a copolymerizable non-cationic monomer (C). The amount of B may range from about 0.05 to about 5%, and preferably from about 0.2 to about 3.0% by weight, with the amount of monomer A plus monomer C (if present) ranging from about 99.9 to about 95% and preferably from about 99.8 to about 97% by weight.

The weight ratio of monomer C to monomer A may vary from about 0:1 to about 10:1 and preferably from about 0:1 to about 1:1.

Various quaternary ammonium cationic monomers known to those skilled in the art may be used as monomer A. The cationic monomers useful in the practice of this invention include diallyldialkylammonium compounds, acryloxyethyltrimethylammonium chloride, methacryloxyethyltrimethylammonium chloride, vinylbenzyltrimethylammonium chloride, and (3-acrylamido-3-methylbutyl) trimethylammonium chloride. The preferred cationic monomers for monomer A are diallyldiaklylammonium compounds which may be represented by the following formula:

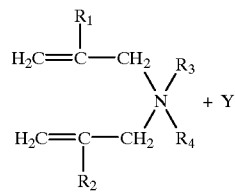

(A)

where $R_1$ and $R_2$ are independently hydrogen or $C_1$–$C_4$ alkyl; $R_3$ and $R_4$ are independently alkyl, hydroxyalkyl, carboxyalkyl, carboxamidoalkyl, or alkoxyalkyl groups having from 1 to 18 carbon atoms; and $Y^-$ represents an anion. Examples of the preferred cationic monomers include diallyldimethylammonium chloride (DADMAC), diallyldimethylammonium bromide, diallyldimethylammonium sulfate, diallyldimethylammonium phosphate, dimethyallyldimethylammonium chloride, diethallyldimethylammonium chloride, diallyldi(beta-hydroxyethyl)ammonium chloride, and diallyldi(beta-ethoxyethyl)ammonium chloride. The most preferred cationic monomer is DADMAC.

Any olefinic compounds containing primary, secondary or tertiary amine functionality and copolymerizable with monomer A may be used as monomer B. The amine functionality includes protonated amine salts as well as the free amine. Suitable compounds for monomer B include diallylamines, monoallylamines, dimethylaminoethyl (meth)acrylates, dimethylaminoethyl (meth)acrylamides, dimethylaminopropyl (meth)acrylamides, t-butylaminoethyl methacrylate, vinylpyridine and various aminostyrenes, such as p-(dimethylaminomethyl)styrene. The preferred amino monomers are diallylamines represented by the formula

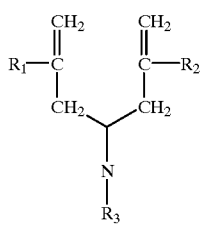

(B)

where $R_1$ and $R_2$ are independently hydrogen or $C_1$–$C_4$ alkyl and $R_3$ is hydrogen, methyl or ethyl. Examples of diallylamine monomers of this type include diallylamine (DAA), di(methallyl)amine, di(ethallyl)amine, N-methyldiallylamine (MDAA), N-ethyldiallylamine, N-methyldi(methallyl)amine, N-methyldi(ethallyl)amine, N-ethyldi(methallyl)amine and N-ethyldi(ethallyl)amine. DAA and MDAA are most preferred.

Suitable compounds for monomer C are water-soluble olefinic monomers which are copolymerizable with monomer A and monomer B. Examples of suitable monomers C include, but are not limited to, acrylamide, methacrylamide, N,N-dimethylacrylamide, acrylic acid, methacrylic acid, vinylsulfonic acid, N-vinylpyrrolidone, hydroxyethyl acrylate and the like.

Copolymerization of monomers A, B and C for the amine-functionalized cationic base polymer can be carried out by aqueous solution polymerization, water-in-oil inverse emulsion polymerization or dispersion polymerization using a suitable free radical initiator. Examples of suitable initiators include persulfates such as ammonium persulfate (APS); peroxides such as hydrogen peroxide, t-butyl hydroperoxide and t-butyl peroxypivalate; azo initiators such as 2,2'-azobis (2-amidinopropane) dihydrochloride, 4,4'-azobis-4-cyanovaleric acid and 2,2'-azobisisobutyronitrile; and redox initiator systems such as t-butyl hydroperoxide/ferrous ion or ammonium persulfate/bisulfite. Aqueous solution polymerization using ammonium persulfate (APS) is the preferred method for preparing the amine-functionalized base cationic polymer of the preferred monomers DADMAC and DAA (or MDAA). The amount of the free radical initiator used in the polymerization process depends on total monomer concentration and the type of monomers used and may range from about 0.2 to about 5.0 weight % of total monomer charge.

It is preferred to carry out the polymerization in the absence of oxygen. Oxygen can be removed from the reaction medium by applying vacuum with agitation, or by boiling or by purging with an inert gas such as nitrogen or argon. The polymerization can then be conducted under a blanket of the inert gas.

The molecular weight of the prepolymer can be controlled by proper choice of initial monomer concentration and the amount and method of addition of initiator. Other techniques for controlling molecular weight of the base polymers, such as variation in reaction temperature or addition of chain transfer agents are well known to those skilled in the art and may be profitably used in these polymerizations.

Diallylamine monomers such as DADMAC, although containing two unsaturated C=C double bonds, are well known to form linear polymers with a free radical initiator through cyclopolymerization. The linear polymers thus formed contain repeat units of 5-membered pyrrolidinium rings. It is desirable to make linear base polymers with high molecular weight using as small as possible an amount of amino monomer. Incorporation of too much amino monomer into the polymer may affect the properties desired from the cationic monomer. Besides, the amino monomer may be more expensive than the cationic monomer. The average amine functionality is proportional both to the content of the amino monomer and the molecular weight of the precursor polymer. For a certain desired value of amine functionality, a base polymer with higher molecular weight is needed if a smaller amount of amino monomer is used in the polymerization. The base polymer should contain an average amine functionality of from 1 to 20, preferably 2 to 8, per polymer molecule. Number average molecular weight (Mn) of the base polymer should be above 2,000, preferably, about 20,000, measured by Gel Permeation Chromatography (GPC) relative to polyethylene oxide standards.

Reaction conditions such as monomer concentration, initiator concentration, reaction temperature and reaction time all combine to affect the molecular weight of the obtained base polymer. Those skilled in the art, being aware of the principles of the present invention as disclosed herein, will be capable of selecting suitable reaction conditions to achieve particular desired molecular weight and amine functionality for the base polymer without undue experimentation.

(b) Cross-linking the Base Polymer

The base polymer prepared from Step (a) is cross-linked by reacting it with a cross-linking agent. Compounds with two (preferred) or more functional groups that can react with the amine functional groups in the base polymer can be used as a cross-linking agent. Suitable cross-linking agents include, but are not limited to, polyfunctional epoxy compounds, dihaloalkyl compounds, diisocyanate compounds and compounds containing at least two activated olefinic double bonds.

Examples of polyfunctional epoxy compounds include epihalohydrins such as epichlorohydrin, ethylene glycol diglycidyl ether (EGDE); diglycidyl ether; 1,2,3,4-diepoxybutane; 1,2,5,6-diepoxyhexane; poly(propylene glycol) diglycidyl ether (PPGDE); 1,4-butanediol diglycidyl ether, 3-bis(glycidyloxy)methyl-1,2-propanediol, bisphenol A diglycidyl ether (BADGE), poly(phenylglycidyl ether-co-formaldehyde), glycerol propoxylate triglycidyl ether, N,N-diglycidyl-4-glycidyloxyaniline, triglycidyl isocyanurate and the like. Preferred epoxy cross-linkers are epichlorohydrin and ethylene glycol diglycidyl ether.

Examples of dihaloalkyl compounds include 1,2-dichloroethane, 1,2-dibromoethane, 1,3-dichloropropane, 1,4-dichlobutane, 1,6-dichlorohexane, 1,10-dichlorodecane and the like. Preferred dihaloalkyl cross-linkers are 1,2-dibromoethane and 1,2-dichloroethane.

Diisocyanate compounds can be used as the cross-linking agent for base polymers containing primary or secondary amino groups. Examples of diisocyanate compounds are isophorone diisocyanate (IPDI), 1,4-diisocyanobutane, hexamethylene diisocyanate (HDI), toluene diisocyanate (TDI) and the like.

Compounds containing at least two activated olefinic double bonds can be used as the cross-linking agent for base polymers containing primary or secondary amino groups. Examples of such cross-linkers include N,N'-methylenebisacrylamide (MBA), N,N'-ethylenebisacrylamide, ethylene glycol diacrylate, diethylene glycol diacrylate, poly(ethylene glycol) diacrylate, poly(propylene glycol) diacrylate and the like. MBA is the preferred cross-linking agent.

The cross-linking agent is used in an amount ranging from about 0.02 to about 3.0 moles, preferably from 0.2 to 1.0 mole, of reactive groups in the cross-linking agent for each mole of reactive amine present in the base polymer. The equivalent ratio of cross-linking agent to base polymer may change depending on the desired properties for the final polymer.

The cross-linking agent may be used in an amount just enough to give a desired product viscosity after being fully reacted with amine functional groups in base polymer. In such cases, the equivalent ratio of cross-linking agent to base polymer should be less than 1.0. The cross-linking agent may be added in small increments to control the viscosity advancement. The reaction is allowed to proceed after each increment addition of the cross-linking agent until the increase in viscosity begins to level off. If the desired product viscosity has not yet been reached, another increment of cross-linking agent will be added.

When the desired product viscosity is achieved, the reaction is stopped by addition of an acid to the reactor to bring the reaction pH to below 7.0, preferably below 6.0. Inorganic as well as organic water soluble acids may be used including hydrochloric acid, sulfuric acid, nitric acid, phosphoric acid, formic acid and acetic acid. Once the total quantity of cross-linking agent that produces the desired product viscosity is known, the number of incremental addition steps may be reduced, in many instances to a single addition step.

The cross-linking reaction can be carried out in aqueous medium or in the same reaction medium (e.g., water-in-oil emulsion) as used for preparing the base polymer in Step (a). The reaction is preferably carried out in aqueous medium at a pH from about 7 to about 12, preferably from 7.5 to 10, and at a temperature from about 25 to about 100° C., preferably from 40° C. to 80° C. The solid concentration of base polymer in the reaction medium prior to reaction can be, by weight, from 1 to about 60 weight %, preferably from 5 to 25 weight % for a solution base polymer, and preferably from 20 to 50 weight % for an emulsion or dispersion base polymer. The base polymer solution to be reacted may be obtained by diluting a base polymer solution of higher concentration. For example, a base polymer solution having a solid concentration of from about 10 to about 25 weight % may be prepared by diluting with water a base polymer solution having a solid concentration between about 35 and about 60 weight %.

The higher molecular weight cross-linked cationic polymers of the present invention have number-average molecular weights between about 20,000 and about 2,000,000 daltons, and preferably between about 50,000 and about 500,000 daltons, again measured by GPC relative to polyethylene oxide standards. The polymer molecular weight may also be expressed in terms of bulk viscosity of polymer solutions. The polymerization process yield aqueous polymer solutions having bulk viscosities of at least 3,000 cps at about 20 percent solids. Viscosities of at least 5,000 cps are preferred. A viscosity of at least about 33,400 cps at 16% solids is capable of being obtained through the routine optimization of reaction parameters.

Polymer solutions in accordance with the present invention typically have a solids concentration from about 1 to about 25 weight %. A solids concentration from about 5 to about 20 weight % is preferred. The polymer solutions exhibit intrinsic viscosities above about 1.3 dL/g.

The present invention includes methods by which suspended particles are removed from aqueous media with the cross-linked polymer solution of the present invention through agglomeration. Methods are also included by which suspended particles are recovered from aqueous media with the cross-linked polymer solution of the present invention. For example, the solution may be used as a retention aid in papermaking. As noted above, depending upon the polymer molecular weight, the agglomeration is obtained by either coagulation, flocculation or a combination of the two mechanisms.

For purposes of the present invention, the particles to be removed by the polymer solution of the present invention include solid particles, such as minerals, cellulosic or insoluble organic materials. Thus, the polymers of the present invention may be used for potable or waste water clarification, sludge de-watering, mineral processing, papermaking or other such uses as are well known to those skilled in the art.

For purposes of the present invention, the particles to be removed by the polymer solution of the present invention include fine droplets of non-polar organic materials, such as oils, the suspension of which in an aqueous medium is commonly referred to as an emulsion. Stated another way, the polymer solution of the present invention can be used to demulsify emulsified oil and water mixtures.

The particle removal by agglomeration is performed using essentially conventional coagulation or flocculation techniques that are well known to those of ordinary skill in the art. The polymer solution is added to the aqueous media in an amount effective to provide a polymer concentration from about 50 and about 5000 ppm, and preferably between about 100 and about 3000 ppm. The suspended particles are permitted to form polymer agglomerates. The aqueous media may be agitated to increase the contact between the polymer in solution and the suspended particles. For purposes of particle removal by agglomeration, polymers like those described in the present invention are often used in combination with other known coagulants and/or flocculants.

For purposes of the present invention, coagulation is defined as the neutralization of surface charge on particle surfaces, which charge causes the particles to repel each other rather than associating into larger particles that can be more easily separated. Flocculation is defined as an agglomeration mechanism by which individual higher molecular weight polymer molecules bind to multiple particles in suspension.

The flocculated agglomerates obtain a particle size that readily precipitates from the aqueous media so that aqueous media essentially free of suspended particles may be recovered simply by decanting the supernatant liquid. Agglomerates formed by coagulation, on the other hand, are of a smaller particle size and do not precipitate so readily. The smaller coagulated aggregates also retain more of the fluid phase and have a tendency to plug filters. More advanced separation techniques are employed to separate the agglomerates from the aqueous media, such as centrifugation, admixture of other solids such as clays or silica, which bind to the agglomerates, increasing their size and ease of separation and the like. These techniques are well known to those of ordinary skill in the coagulation art, and may also be employed to accelerate the precipitation of flocculated agglomerates.

The present invention also includes substrates coated with a layer of the cross-linked polymer of the present invention. Paper is a particularly preferred substrate. Otherwise conventional cationic polymer solution coating techniques are employed, in which there is formed on the substrate a layer of the aqueous cross-linked polymer solution of the present invention, as opposed to when the polymer serves as a papermaking retention aid and is incorporated into the pulp matrix. The distinction is that with coating process, the polymer is applied to a paper, rather than a pulp web, after which the polymer layer is dried.

The following non-limiting Examples set forth hereinbelow illustrates certain aspects of the invention. All parts and percentages are by weight, unless otherwise noted, and all temperatures are in degrees Celsius.

DADMAC was obtained from Ciba Specialty Chemicals of Woodbridge, N.J.; VERSENE was obtained from Dow Chemical Co.; the hydrochloric acid and caustic were obtained from Chemtech Industries of St. Louis, Mo. Ammonium persulfate was obtained from Samirian Chemical Co. of Cupertino, Calif.; epichlorohydrin was obtained from the Shell Chemical Co; methyldiallylamine was obtained from Pfaltz and Bauer, Inc. of Waterbury, Conn. All other chemicals were obtained from Aldrich Chemical Co., Milwaukee, Wis. The reagents were of commercial grade and were used as received.

EXAMPLES

Intrinisic viscosity in a salt solution is commonly used to indicate molecular weight of a water-soluble polymer. It is well known that a branched or cross-linked polymer gives a lower intrinsic viscosity value than a linear polymer of the same type and the same molecular weight. A conventional Huggins relationship (Equation 1) is used to determine intrinsic viscosity, $\eta$, $$\eta_{sp}/C = [\eta] + k_H[\eta]^2 C \quad (1)$$

where $\eta_{sp}$ is the specific viscosity, C is the polymer concentration and $k_H$ is called the Huggins constant. The value of the Huggins constant, $K_H$, can indicate extent of cross-linking. A cross-linked polymer has a higher $k_H$ value and a lower $[\eta]$ value than the corresponding linear polymer with the same molecular weight. Therefore, the measured $[\eta]$ value alone cannot be used to compare molecular weights of polymers with different cross-linking extents.

Assuming that linear polymers of the same type but with different molecular weight give the same Huggins constant $k_{HL}$, and that the $\eta_{sp}/C$ vs C straight lines of a cross-linked polymer and its corresponding linear polymer with the same molecular weight intersect at a critical point $C=1/[\eta]$, one can obtain the following relationship:

$$[\eta]_L/[\eta] = \frac{\{1+4k_{HL}(1+k_H)\}^{\frac{1}{2}} - 1}{2\, k_{HL}} \quad (2)$$

where $[\eta]_L$ is called the linear intrinsic viscosity with a linear Huggins constant of $k_{HL}$ for a cross-linked polymer with measured values of $[\eta]$ and $k_H$. $[\eta]_L$ is indicative of molecular weight and its value can be used to compare molecular weight of cross-linked polymers with different cross-linking extents. The ratio, $[\eta]_L/[\eta]$, is called the cross-linking index and can be used to indicate the cross-link extent of a cross-linked polymer. A high cross-link index indicates a high degree of cross-linking. In examples, the intrinsic viscosity, $[\eta]$, and the Huggins constant, $k_H$, was measured in 1 M NaCl aqueous solution. The measured $k_H$ of a base polymer was used as $k_{HL}$ in determining the linear intrinsic viscosity $[\eta]_L$ for its cross-linked products.

Examples 1 to 6

Synthesis of Amine Functionalized Base Polymers

A suitable reactor kettle equipped with a condenser, a thermometer, a nitrogen inlet, and an overhead agitator was charged with the desired amount of reagents as shown in Table 1. The polymerization mixture was purged with nitrogen and heated with agitation to a temperature of 80° C. An aqueous solution containing 2.31 g of ammonium persulfate (APS) was slowly fed to the reactor over 346 minutes. The reaction temperature was allowed to increase to above 90° C. and then maintained at 90 to 100° C. during the APS feed period. After the APS feed, the reaction mixture was diluted with deionized water to about 35% solids and held at 90° C. for about 30 minutes. Then an aqueous solution containing 1.00 g of sodium metabisufite (MBS) was added over 10 minutes. The reactor content was held at 90° C. for another 30 minutes to complete the polymerization (above 99% conversion).

The polymer solution was diluted with sufficient water to about 20% solids and analyzed for Brookfield viscosity (BV), intrinsic viscosity ($[\eta]$), Huggins coefficient ($k_H$), molecular weights and molecular weight distribution. The intrinsic viscosity and the Huggins coefficient were determined in 1M NaCl aqueous solution at 30° C. using standard procedures well known to one of ordinary skill in the art. The weight average molecular weight, Mw, and number average molecular weight, Mn, were determined by gel permeation chromatography (GPC) relative to polyethylene oxide standards. The Mw/Mn ratio or polydispersity index is an indication of molecular weight distribution, with high value indicating a broad distribution.

The results of these studies on the prepared amine-functionalized base polymers are summarized in Table 1. The amine equivalent weight, N-EW, was determined by the level of functional amine monomer charged to make the base polymer. The average amine functionality per molecule, Fn, was calculated from Mn and N-EW. The Fn increases with increasing level of functional amine monomer charged and with decreasing molecular weight of the polymer obtained.

TABLE 1

Reactor charges for Examples 1 to 6

| Example | 1 | 2 | 3 | 4 | 5 | 6 (note 1) |
| --- | --- | --- | --- | --- | --- | --- |
| Reactor Charge | | | | | | |
| DADMAC (65%) | 306.5 | 305.8 | 304.6 | 917.5 | 304.6 | 609.2 |
| DAA (99%) | 0.80 | 1.20 | 2.00 | 3.60 | 2.00 | 4.0 |
| MDAA (97%) | 0 | 0 | 0 | 0 | 0 | 0 |
| Hcl (37%) | 0.81 | 1.22 | 2.03 | 3.66 | 2.08 | 4.06 |
| Na$_2$EDTA | 0.23 | 0.23 | 0.20 | 0.60 | 0.20 | 0.40 |
| Deionized Water | 60.10 | 60.0 | 59.60 | 180.0 | 24.5 | 118.5 |
| Properties of the amine-functionalized base polymer products | | | | | | |
| Solid wt % | 20.2 | 20.4 | 20.5 | 20.1 | 10.0 | 20.5 |
| BV (25° C.), cps | 1,240 | 1,760 | 1,820 | 860 | 750 | 1,030 |

TABLE 1-continued

Reactor charges for Examples 1 to 6

| Example | 1 | 2 | 3 | 4 | 5 | 6 (note 1) |
|---|---|---|---|---|---|---|
| [η], Dl/g | 1.14 | 1.26 | 1.29 | 1.04 | 1.84 | 1.09 |
| $k_H$ | 0.32 | 0.43 | 0.36 | 0.33 | 0.53 | 0.48 |
| Mw, mole/g | 429,000 | 504,000 | 452,000 | 344,000 | 589,000 | 387,000 |
| Mn, mole/g | 90,000 | 98,000 | 106,000 | 59,500 | 125,000 | 50,200 |
| Mw/Mn | 4.78 | 5.13 | 4.25 | 5.78 | 4.71 | 7.71 |
| Amine, mole % | 0.66 | 0.99 | 1.65 | 0.99 | 1.65 | 1.65 |
| N-EW, mole/g | 24,700 | 16,500 | 9,900 | 16,500 | 9,900 | 9,900 |
| Fn | 3.6 | 6.0 | 10.7 | 3.6 | 12.6 | 5.1 |

1 4.62 g APS fed over 346 minutes; 3.20 g MBS fed over 15 minutes

Example 7

To a 1-liter reactor kettle equipped with a condenser, a thermometer, a nitrogen inlet, and an overhead agitator was charged with 609.23 g of 65.0% DADMAC, 4.0 g of DAA, 118.5 g of deionized water, 0.40 g of sodium lauryl sulfate, 0.40 g Versene (40% $Na_4EDTA$) and 4.06 g of 37% Hcl solution. The reactor charge was purged with nitrogen and heated with agitation to a temperature of 80° C. An aqueous solution containing 5.02 g of ammonium persulfate (APS) was slowly fed to the reactor over 354 minutes. The reaction temperature was allowed to increase to above 90° C. and then maintained at 90 to 100° C. during the APS feed period. After the APS feed, the reaction mixture was held at 90° C. for about thirty minutes. Then an aqueous solution containing 4.00 g of sodium metabisulfite (MBS) was added over 20 minutes. The reactor content was held at 90° C. for another 30 minutes to complete the polymerization (above 99% conversion). The polymer solution was diluted with sufficient water to 20.0% solids and analyzed to have a Brookfield viscosity (BV) of 1000 cps at 25° C., intrinsic viscosity ([η]) of 1.09 Dl/g, Huggins constant ($k_H$) of 0.44, Mw of 322,000 and Mw/Mn=7.58. The amine equivalent weight, N-EW, was determined to be 9,900 and the average amine, functionality per molecule, Fn, 4.3.

Example 8

A 1-liter reactor fitted with a mechanical stirrer, addition funnel and condenser was charged with 300.00 grams (0.0025 mole secondary amine, NH) of the base polymer from Example 1. The reactor content was heated to 70° C. with agitation and adjusted with NaOH aqueous solution to pH of 9.0 to 9.5. After the pH adjustment, 0.44 g (0.0025 mole expoxide, EP) of 50% ethylene glycol diglycidyl ether (EGDE) solution was added into the reactor to give an EP/NH ratio of 1.0. The cross-link reaction was maintained at about 70° C. and the viscosity advancement was monitored. After two hours, the viscosity reached about 5,000 cps (25° C.) and showed little further increase with increasing reaction time. Then another 0.44 g of 50% of EGDE was added into the reactor to give a total EP/NH ratio of 2.0. The cross-link reaction was allowed to proceed at 70° C. until little further increase in viscosity could be observed. After the reaction, the solution was adjusted with concentrated Hcl solution to a pH of about 3.0. The final product was a gel-free clear polymer solution with a Brookfield viscosity of 8,900 cps at 25° C. and 21% solids. The polymer was determined to have an intrinsic viscosity of 1.62 Dl/g and Huggins constant of 0.53 in 1 M NaCl solution. The linear intrinsic viscosity $[\eta]_L$ at $k_{HL}$=0.33 was determined to be 1.81 Dl/g and the cross-link index $[\eta]_L/[\eta]$=1.31.

Example 9

The reactor of Example 8 was charged with 300.00 grams (0.0038 mole secondary amine, NH) of the base polymer from Example 2. The reactor content was heated with agitation and adjusted with NaOH aqueous solution as in Example 8. After the pH adjustment, 0.68 g (0.0038 mole epoxide, EP) of 50% ethylene glycol diglycidyl ether (EGDE) solution was added into the reactor to give an EP/NH ratio of 1.0. The cross-link reaction was maintained as in Example 8. Water was added to dilute the reactor content to 16% solids after 15 minutes when viscosity of the reactor content became too high for agitation. The cross-link reaction was then allowed to proceed at 70° C. until little further increase in viscosity could be observed. After the reaction, pH was adjusted as in Example 8. The final product was a gel-free clear polymer solution with a Brookfield viscosity of 33,400 cps at 25° C. and 16% solids. The polymer was determined to have an intrinsic viscosity of 1.74 Dl/g and Huggins constant of 0.87 in 1M NaCl solution. The linear intrinsic viscosity $[\eta]_L$ at $k_{HL}$=0.33 was determined to be 2.27 Dl/g and the cross-link index $[\eta]_L/[\eta]$=1.31.

Example 10

The reactor of Example 8 was charged with 300.00 grams (0.0062 mole secondary amine, NH) of the base polymer from Example 3. The reactor content was heated with agitation and adjusted with NaOH aqueous solution as in Example 8. After the pH adjustment, 0.094 g (0.00054 mole epoxide, EP) of 50% ethylene glycol diglycidyl ether (EGDE) solution was added into the reactor to give an EP/NH ratio of 0.09. The cross-link reaction was maintained as in Example 8. After one hour, the viscosity reached about 5,800 cps (25° C.) and showed little increase with increasing reaction time. Another 0.094 g of 50% EGDE was added into the reactor to give a total EP/NH ratio of 0.18. The cross-link reaction was allowed to proceed at 70° C. until little further increase in viscosity could be observed. After the reaction, the pH was adjusted as in Example 8. The final product was a gel-free clear polymer solution with a Brookfield viscosity of 19,000 cps at 25° C. and 20.6% solids. The polymer was determined to have an intrinsic viscosity of 1.60 Dl/g and Huggins constant of 0.84 in 1M NaCl solution. The linear intrinsic viscosity $[\eta]_L$ at $k_{HL}$=0.33 was determined to be 2.06 Dl/g and the cross-link index $[\eta]_L/[\eta]$=1.29.

Example 11

The reactor of Example 8 was charged with 300.00 grams (0.0038 mole secondary amine, NH) of the base polymer from Example 2. The reactor content was heated with agitation and adjusted with NaOH aqueous solution as in Example 8. After the pH adjustment, 0.0182 g (0.00039 mole epoxide, EP) of epichlorohydrin (Epi) was added into the reactor to give an EP/NH ratio of 1.0. The cross-link reaction was maintained as in Example 8. After two hours, the viscosity reached about 6,400 cps (25° C.) and showed little increase with increasing reaction time. Then another 0.074 g of Epi was added in three shots into the reactor to give a total EP/NH ratio of 1.5. The cross-link reaction was allowed to proceed at 70° C. until little further increase in viscosity could be observed. After the reaction, the pH was adjusted as in Example 8. The final product was a gel-free clear polymer solution with a Brookfield viscosity of 14,000 cps at 25° C. and 21% solids. The polymer was determined to have an intrinsic viscosity of 1.68 Dl/g and Huggins constant of 0.71 in 1M NaCl solution. The linear intrinsic viscosity $[\eta]_L$ at $k_{HL}=0.33$ was determined to be 2.05 Dl/g and the cross-link index $[\eta]_L/[\eta]=1.22$.

Example 12

The reactor of Example 8 was charged with 300.00 g (0.0025 mole secondary amine, NH) of the base polymer from Example 1. The reactor content was heated with agitation and adjusted with NaOH aqueous solution as in Example 8. After the pH adjustment, 0.16 g (0.00017 mole epoxide, EP) N,N-diglycidyl-4-glycidyloxyaniline (DGGA) was added into the reactor to give an EP/NH ratio of 0.7. The cross-link reaction was maintained as in Example 8. After two hours, the viscosity reached about 4,400 cps (25° C.) and showed little further increase with increasing reaction time. Then another 0.104 g of DGGA was added in into the reactor to give a total EP/NH ratio of 1.1. The cross-link reaction was allowed to proceed at 70° C. until little increase in viscosity could be observed. After the reaction, the pH was adjusted as in Example 8. The final product was a gel-free haze-clear polymer solution with a Brookfield viscosity of 7,300 cps at 25° C. and 20.9% solids. The polymer was determined to have an intrinsic viscosity of 1.60 Dl/g and Huggins constant of 0.45 in 1M NaCl solution. The linear intrinsic viscosity $[\eta]_L$ at $k_{HL}=0.33$ was determined to be 1.71 Dl/g and the cross-link index $[\eta]_L/[\eta]=1.07$.

Example 13

The reactor of Example 8 was charged with 300.00 g (0.0038 mole secondary amine, NH) of the base polymer from Example 4. The reactor content was heated with agitation and adjusted with NaOH aqueous solution as in Example 8. After the pH adjustment, 0.58 g (0.00037 mole epoxide, EP) of poly(phenyl glycidyl ether-co-formaldehyde) (PPGEF, average MW=314) was added into the reactor to give an EP/NH ratio of 1.0. The cross-link reaction was allowed to proceed at 70° C. The reactor content was diluted with water to 15% solids when viscosity became too high for agitation. After dilution, the cross-link reaction continued until little further increase in viscosity could be observed. After the reaction, the pH was adjusted as in Example 8. The final product was a gel-free white-emulsion-like polymer solution with a Brookfield viscosity of 7,800 cps at 25° C. and 14.9% solids. The polymer was determined to have an intrinsic viscosity of 1.49 Dl/g and Huggins constant of 1.16 in 1M NaCl solution. The linear intrinsic viscosity $[\eta]_L$ at $k_{HL}=0.33$ was determined to be 2.17 Dl/g and the cross-link index $[\eta]_L/[\eta]=1.46$.

Example 14

The reactor of Example 8 was charged with 300.00 g (0.0062 mole secondary amine, NH) of the base polymer from Example 3. The reactor content was heated with agitation and adjusted with NaOH aqueous solution as in Example 8. After pH adjustment, 0.31 g (0.0062 mole chlorine, Cl) ethylene dichloride (EDC) was added to the reactor to give an Cl/NH ratio of 1.0. The cross-link reaction was maintained as in Example 8. After nine hours, the viscosity reached about 6,000 cps (25° C.) and showed little further increase with increasing reaction time. Another 0.31 g of EDC was added to the reactor to give a total Cl/NH ratio of 2.0. The cross-link reaction was allowed to proceed at 70° C. until little further increase in viscosity could be observed. After the reaction, the pH was adjusted as in Example 8. The final product was a gel-free clear polymer solution with a Brookfield viscosity of 15,000 cps at 25° C. and 20.8% solids. The polymer was determined to have an intrinsic viscosity of 1.64 Dl/g and Huggins constant of 0.71 in 1M NaCl solution. The linear intrinsic viscosity $[\eta]_L$ at $k_{HL}=0.33$ was determined to be 2.00 Dl/g and the cross link index $[\eta]_L/[\eta]=1.22$.

Example 15

The reactor of Example 5 was charged with 400.00 g (0.0040 mole secondary amine, NH) of the 10.0% base polymer solution from example 5. The reactor content was heated with agitation and adjusted with NaOH aqueous solution as in Example 8. After pH adjustment, 0.153 g (0.0033 mole epoxide, EP) epichlorohydrin was added to the reactor to give an EP/NH ratio of 0.83. The cross-link reaction was maintained as in Example 8. After three hours, the viscosity increased from 750 cps to about 3,000 cps (25° C.) and showed little further increase with increasing reaction time. The pH was adjusted as in Example 8. The final product was a gel-free clear polymer solution with a Brookfield viscosity of 3,040 cps at 25° C. and 10% solids. The polymer was determined to have an intrinsic viscosity of 1.83 Dl/g and Huggins constant of 0.95 in 1M NaCl solution. The linear intrinsic viscosity $[\eta]_L$ at $k_{HL}=0.33$ was determined to be 2.47 Dl/g and the cross link index $[\eta]_L/[\eta]=1.35$.

Example 16

The reactor of Example 6 was charged with 400.00 g (0.0083 mole secondary amine, NH) of the 20.5% solids base polymer solution from Example 6. The reactor content was heated to 78° C. with agitation and adjusted with NaOH aqueous solution to a pH of 8.0 to 8.5. After pH adjustment, 0.15 g (0.0032 mole epoxide, EP) of epichlorohydrin was added to the reactor to give an EP/NH ratio of 0.39. The cross-link reaction was maintained at about 75° C. and the viscosity advancement was monitored. The reaction pH was maintained at 8.0 to 8.5 with addition of a NaOH solution. An additional 0.25 g of Epi was added as two shots. The EP/NH ratio was thus increased to 1.04. After the reaction, the pH was adjusted as in Example 8. The final product was a gel-free clear polymer solution with a Brookfield viscosity of 10,000 cps at 25° C. and 20.6% solids. The polymer was determined to have an intrinsic viscosity of 1.61 Dl/g and Huggins constant of 0.61 in 1M NaCl solution. The linear intrinsic viscosity $[\eta]_L$ at $k_{HL}=0.33$ was determined to be 1.87 Dl/g and the cross link index $[\eta]_L/[\eta]=1.16$.

Example 17

The reactor of Example 7 was charged with 782.00 g (0.0158 mole secondary amine, NH) of the 20.0% base polymer solution from example 7. The reactor content was heated with agitation and adjusted with NaOH aqueous solution as in Example 8. After pH adjustment, 0.528 g (0.0114 mole epoxide, EP) epichlorohydrin was added to the reactor to give an EP/NH ratio of 0.72. The cross-link reaction was maintained as in Example 8. After four hours, the viscosity increased from 1000 cps to about 6,000 cps (25° C.) and showed little further increase with increasing reaction time. The pH was adjusted as in Example 8. The final product was a gel-free clear polymer solution with a Brookfield viscosity of 5,560 cps at 25° C. and 20.6% solids.

The polymer was determined to have an intrinsic viscosity of 1.56 Dl/g and Huggins constant of 0.48 in 1M NaCl solution. The linear intrinsic viscosity $[\eta]_L$ at $k_{HL}=0.33$ was determined to be 1.70 Dl/g and the cross link index $[\eta]_L/[\eta]=1.09$.

Example 18

A 2% by weight slurry of china clay (Speiswhite, SPS grade, obtained from English China Clays, St. Austell, Cornwall, UK) in water was made up. The slurry was mixed with a high speed impeller until uniform, and 500 cc was transferred to a 500 cc measuring cylinder. The cylinder was equipped with a plunger consisting of a perforated plate with a long thin handle. The plunger was moved up and down through the slurry several times to mix the contents. An appropriate dose of the flocculent was added via syringe as an aqueous solution of appropriate concentration, typically 0.05%, and the flocculent was mixed with the slurry by three controlled and uniform strokes of the plunger. The time required for the mudline to fall through a distance of 5 cm was measured and converted to a rate (cm/min). A faster settlement rate or a comparably fast settlement rate at lower dosage was indicative of better flocculation. Settlement rate data for some polymers produced as described in the examples above are given below. Two commercial materials, AGEFLOC™ WT40HV and AGEFLOC™ PC2206, produced by Ciba Specialty Chemicals, Woodbridge, N.J., are shown for comparison.

| Dose | Settlement Rate (cm/min) | | | | |
|---|---|---|---|---|---|
| | AGEFLOC™ | AGEFLOC™ | Example | | |
| mg/l | WT40HV | PC2206 | 11 | 16 | 17 |
| 1.5 | 9.7 | 10.3 | 11.6 | 11.4 | 11.2 |
| 3.0 | 11.1 | 13.1 | 13.3 | 13.6 | 13.5 |
| 4.0 | 11.9 | 13.5 | 15.1 | 13.7 | 13.8 |
| 6.0 | 11.3 | 13.8 | 14.9 | 14.1 | 14.0 |

It should be understood that the above description and examples are illustrative of the invention, and are not intended to be limiting. Many variations and modifications are possible without departing from the scope of this invention.

What is claimed is:

1. A method for the preparation of high molecular weight aqueous cationic polymer solutions, said method comprising:
   (a) providing an about 1 to about 25 wt % solids aqueous solution of an amine functionalized cationic base polymer, in which the monomer units of said polymer comprise from about 0.05 to about 5.0% amine functionalized monomer units, each independently selected from the group consisting of primary, secondary and tertiary amine functionalized monomer units, and from about 95 to about 99.95% additional monomer units comprising cationic monomer units and optional non-cationic monomer units, wherein said additional monomer units have a ratio of non-cationic to cationic monomer units between about 0:1 and about 10:1; and
   (b) adding to said base polymer solution a cross-linking agent reactive with said primary, secondary or tertiary amines of said base polymer, in an amount providing between about 0.02 to about 3.0 equivalents of cross-linking agent reactive groups per each mole of primary, secondary or tertiary base polymer amines, so that said cross-linking agent reacts with said base polymer to form an aqueous solution of a higher molecular weight cross-linked cationic polymer.

2. The method of claim 1, wherein said step of providing an about 1 to about 25 weight % solids aqueous solution of said polymer comprises diluting with water a more concentrated aqueous solution of said base polymer having a solids concentration between about 35 and about 60 weight %.

3. The method of claim 1, wherein said cationic monomer is diallyldimethylammonium chloride.

4. The method of claim 3, wherein said amine functionalized monomer units comprise diallylamine or methyldiallylamine.

5. The method of claim 1, wherein said cross-linking agent is selected from the group consisting of polyfunctional epoxide compounds and dihaloalkyl compounds.

6. The method of claim 5, wherein said cross-linking agent is selected from the group consisting of ethylene glycol diglycidyl ether, poly(propylene glycol) diglycidyl ether, epichlorohydrin and bisphenol A diglycidyl ether.

7. The method of claim 5, wherein said cross-linking agent is ethylene dichloride or ethylene dibromide.

8. A high molecular weight, water-soluble, cross-linked cationic polymer prepared by reacting an amine functionalized cationic base polymer, in which the monomer units of said base polymer comprise from about 0.05 to about 5.0% amine functionalized monomer units, each independently selected from the group consisting of primary, secondary and tertiary amine functionalized monomer units, and from about 95 to about 99.95% additional monomer units comprising cationic monomer units and optional non-cationic monomer units, wherein said additional monomer units have a ratio of non-cationic to cationic monomers units between about 0:1 and about 10:1, with an amount of a cross-linking agent reactive with said primary, secondary or tertiary amines of said base polymer and providing between about 0.02 to about 3.0 equivalents of cross-linking agent reactive groups per each mole of primary, secondary or tertiary base polymer amine.

9. The polymer of claim 8, wherein said cationic monomer unit is diallyldimethylammonium chloride.

10. The polymer of claim 9, wherein said amine functionalized monomer units comprise diallylamine or methyldiallylamine.

11. The polymer of claim 8, wherein said cross-linking agent is selected from the group consisting of polyfunctional epoxide compounds and dihaloalkyl compounds.

12. The polymer of claim 11, wherein said cross-linking agent is selected from the group consisting of poly(propylene glycol) diglycidyl ether, epichlorohydrin, bisphenol A diglycidyl ether, and ethylene glycol diglycidyl ether.

13. The polymer of claim 11, wherein said cross-linking agent is ethylene dichloride or ethylene dibromide.

14. An aqueous solution comprising the polymer of claim 8.

15. The aqueous solution of claim 14, having a solids content between about 1 and 25 weight %.

16. The aqueous solution of claim 15, having a solids content of up to about 20 weight % and having a bulk viscosity greater than about 3000 cps at 25° C.

* * * * *